US012579380B2

(12) United States Patent
Jain et al.

(10) Patent No.: US 12,579,380 B2
(45) Date of Patent: Mar. 17, 2026

(54) SOCIO-MINDFULNESS IN MULTI-PARTY DISCUSSIONS

(71) Applicant: International Business Machines Corporation, Armonk, NY (US)

(72) Inventors: Sanket Jain, Gurgaon (IN); Sukumar Beri, New Delhi (IN); Jatinder S. Joshi, Gurgaon (IN); Jonathan D. Dunne, Dungarvan (IE); Jasbir Singh Dhaliwal, Noida (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/541,102

(22) Filed: Dec. 15, 2023

(65) Prior Publication Data

US 2025/0200295 A1      Jun. 19, 2025

(51) Int. Cl.
*G06F 40/35* (2020.01)
*G06F 40/40* (2020.01)
*H04N 7/15* (2006.01)

(52) U.S. Cl.
CPC .............. *G06F 40/40* (2020.01); *H04N 7/15* (2013.01)

(58) Field of Classification Search
CPC .......... G06F 40/35; G06F 16/437; H04N 7/15
See application file for complete search history.

(56) References Cited

U.S. PATENT DOCUMENTS

| | | | |
|---|---|---|---|
| 8,468,244 B2 | 6/2013 | Redlich | |
| 8,762,413 B2 * | 6/2014 | Graham, Jr. ........... | G06Q 30/02 |
| | | | 707/790 |
| 9,292,880 B1 * | 3/2016 | Koorakula ............... | G06N 7/01 |
| 10,320,723 B2 * | 6/2019 | Rideout ................ | H04L 51/046 |
| 10,878,307 B2 * | 12/2020 | Koukoumidis ........ | G06N 20/00 |
| 10,943,070 B2 * | 3/2021 | Koseki .................... | G06N 3/006 |
| 11,502,975 B2 | 11/2022 | Gershony | |
| 11,514,536 B2 | 11/2022 | Sharp | |
| 11,620,333 B2 * | 4/2023 | Kim ........................ | G10L 15/26 |
| | | | 704/235 |
| 2008/0201447 A1 | 8/2008 | Kim | |
| 2010/0205541 A1 | 8/2010 | Rapaport | |
| 2012/0058455 A1 | 3/2012 | Lawrence | |
| 2018/0350366 A1 | 12/2018 | Park | |
| 2022/0383260 A1 * | 12/2022 | Palamadai ............ | H04L 67/306 |
| 2025/0131201 A1 * | 4/2025 | Ullrich .................... | G06F 40/35 |

OTHER PUBLICATIONS

"AI-Powered Communication Engine with Intelligent Routing and Dynamic Conversation Techniques", An IP.com Prior Art Database Technical Disclosure, IP.com No. IPCOM000264537D, IP.com Electronic Publication Date: Jan. 4, 2021, 7 pps., <https://priorart.ip.com/IPCOM/000264537>.

(Continued)

*Primary Examiner* — Daniel Abebe
(74) *Attorney, Agent, or Firm* — Andre Adkins

(57) ABSTRACT

Techniques are described with respect to a system, method, and computer program product for predicting conversation for multi-party discussions. An associated method includes analyzing a plurality of linguistic inputs; generating an interest graph based on the analysis; extracting a plurality of temporal data from the interest graph; and generating a Post-Salutations Alignment Model (PSAM) based on clustering of the plurality of temporal data.

20 Claims, 6 Drawing Sheets

(56)     References Cited

OTHER PUBLICATIONS

"System and Method to Provide Personal History Content Delivery and Conversation Assistance in the Metaverse", An IP.com Prior Art Database Technical Disclosure, IP.com No. IPCOM000272687D, IP.com Electronic Publication Date: Jul. 14, 2023, 5 pps., <https://priorart.ip.com/IPCOM/000272687>.

Ghosal et al., "DialogueGCN: A Graph Convolutional Neural Network for Emotion Recognition in Conversation", arXiv:1908.11540v1 [cs.CL] Aug. 30, 2019, 11 pps., <https://arxiv.org/abs/1908.11540>.

Meister et al., "Staying Mindful When You're Working Remotely", Harvard Business Review, Mar. 16, 2021, 7 pps., <https://hbr.org/2021/03/staying-mindful-when-youre-working-remotely>.

Ostrowski, "Using latent dirichlet allocation for topic modelling in twitter", Proceedings of the 2015 IEEE 9th International Conference on Semantic Computing (IEEE ICSC 2015), 5 pps., <https://ieeexplore.ieee.org/document/7050858>.

* cited by examiner

Figure 1:
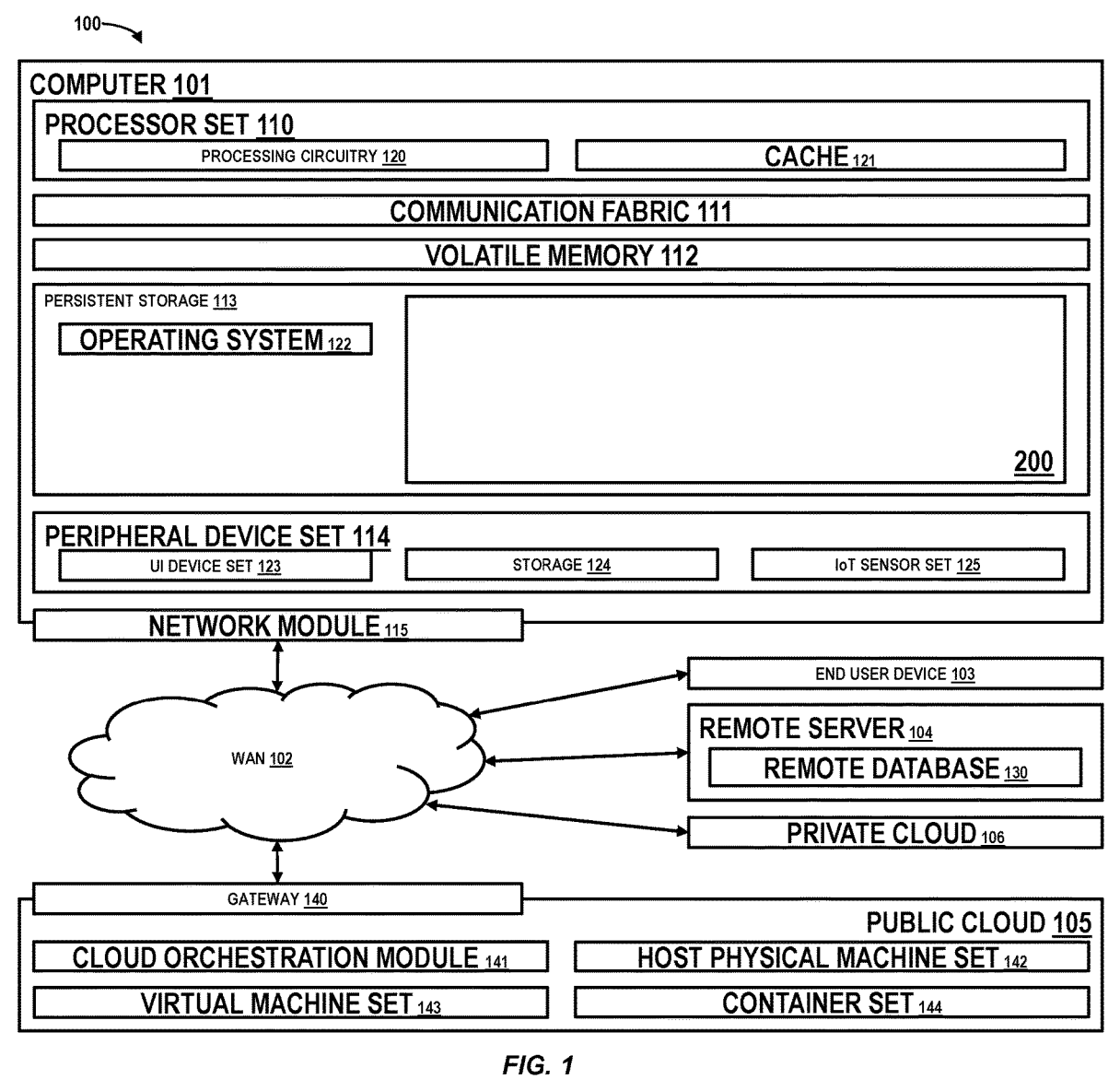

100⌐

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

PSAM Model

600

START

Analyzing linguistic inputs of participants 610

Ascertaining features of linguistic inputs 620

Generating interest graphs 630

Extracting temporal data from interest graphs 640

Generate word cloud of positive/negative keyphrases 650

Generate Post Salutations Alignment Model 660

Present conversational starters to user 670

SOCIO-MINDFULNESS IN MULTI-PARTY DISCUSSIONS

BACKGROUND

The present invention relates generally to computers and computer applications, and more particularly to utilizing machine learning, natural language processing, and deep learning models to integrate socio-mindfulness in multi-party discussions.

The use of telecommunication systems (e.g., teleconferencing software, virtual collaboration platforms, and the like) has become one of the most popular means to for users to communicate and exchange information in real-time within mechanisms known as multi-party discussions. However due to the wide range of participants in multi-party discussions across various geographic locations, factors such as diverse cultures among participants need to be taken into consideration in order to ensure execution of productive multi-party discussions. For example when there is a lack of common talking points among participants in a multi-party discussion, awkward moments of silence may arise during the session resulting in an inhibition of productivity. The ability to foreshadow indicators of commonality among participants not only provides a sense of solidarity among the diverse participants, but more importantly promotes mechanisms for collaborative productivity within a multi-party discussion.

SUMMARY

Additional aspects and/or advantages will be set forth in part in the description which follows and, in part, will be apparent from the description, or may be learned by practice of the invention.

A system, method, and computer program product for predicting conversation for multi-party discussions is disclosed herein. In some embodiments, a computer-implemented method for predicting conversation for multi-party discussions comprises analyzing a plurality of linguistic inputs; generating an interest graph based on the analysis; extracting a plurality of temporal data from the interest graph; and generating a Post-Salutations Alignment Model (PSAM) based on clustering of the plurality of temporal data.

According to one embodiment of the present invention, a computer system identifies a plurality of linguistic inputs. A feature vector is generated for the linguistic inputs, in which the feature vector includes various elements of the linguistic inputs including, but not limited to temporal data, sentiment, context, content, classification (e.g., greeting, farewell, cultural caesura, and the like), etc. The feature vector(s) is processed used a plurality of machine learning models in order to render interest graphs associated with a multi-party discussion and/or its participants. Temporal data along with local and positional-invariant data is extracted from the interest graphs, in which Gaussian Mixture Models (GMM) are utilized followed by Expectation-Maximization (EM) clustering of the temporal data in order to generate the PSAM. The PSAM is utilized to generate at least one conversational starter associated with a multi-party discussion.

Various embodiments of the present invention will now be discussed. In some embodiments, analyses of the linguistic inputs is performed by Convolutional Neural Networks (CNN) allowing one or more of text classification and user intent classification associated with linguistic inputs, in which a plurality of key phrases associated with the linguistic inputs are detected. Once the interest graphs are rendered utilizing the aforementioned practices, the GMMs are used on the large datasets to identify underlying categories of datasets associated with the linguistic inputs. Traditionally, GMMs comprise slower convergences because they converge to the local optimum only; however, herein k-means clustering is utilized for faster convergence of GMMs. Thus, resulting in optimized multi-party discussion participant behaviour analyses. Furthermore, topic modeling is performed by using Latent Dirichlet Allocation (LDA) in order to generate the PSAM, in which the PSAM are ultimately used to generate at least one conversational starter for a multi-party discussion.

BRIEF DESCRIPTION OF THE DRAWINGS

Various embodiments of the present invention will now be discussed. In some embodiments, analyses of the linguistic inputs is performed by Convolutional Neural Networks (CNN) allowing one or more of text classification and user intent classification associated with linguistic inputs, in which a plurality of key phrases associated with the linguistic inputs are detected. Once the interest graphs are rendered utilizing the aforementioned practices, the GMMs are used on the large datasets to identify underlying categories of datasets associated with the linguistic inputs. In some embodiments, k-means clustering is utilized for faster convergence of GMMs; thus, resulting in optimized multi-party discussion participant behaviour analyses. Furthermore, topic modeling is performed by using Latent Dirichlet Allocation (LDA) in order to generate the PSAM, in which the PSAM are ultimately used to generate at least one conversational starter for a multi-party discussion.

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a networked computer environment, according to an exemplary embodiment;

DETAILED DESCRIPTION

Figure 2:
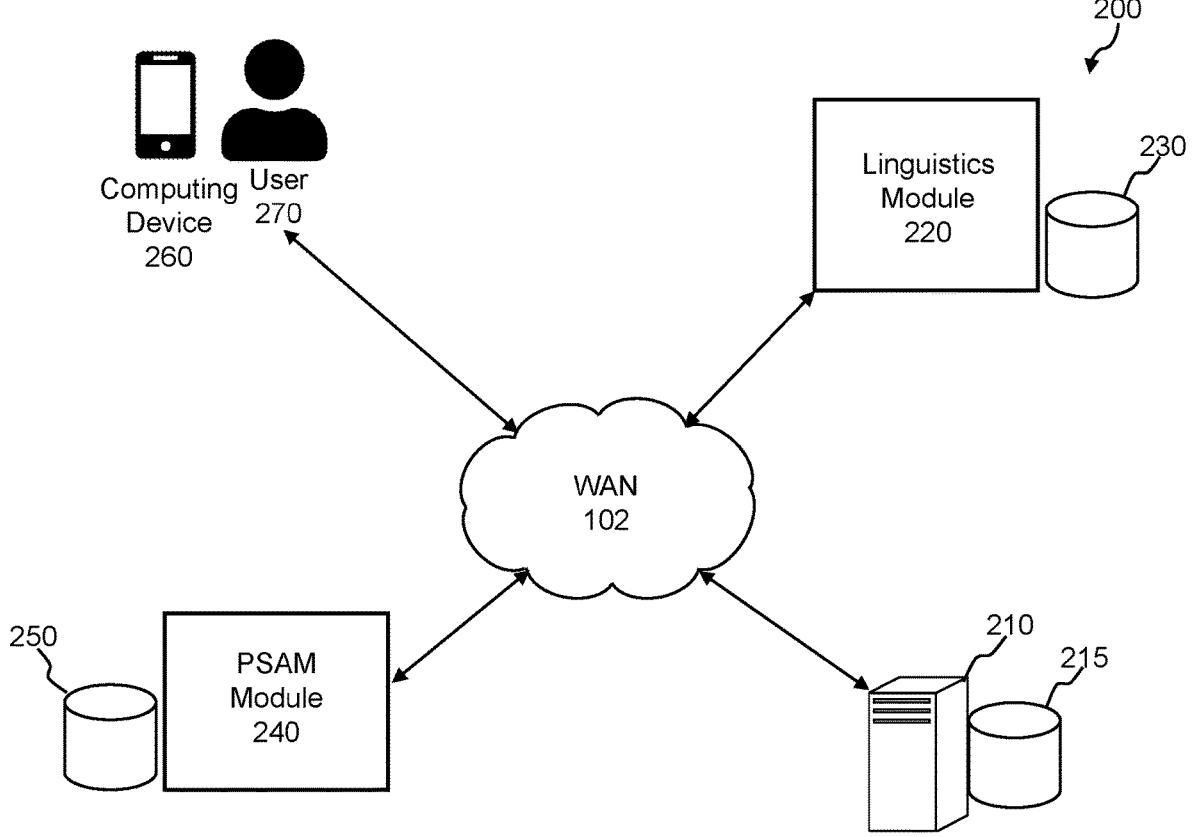
FIG. 2 illustrates a block diagram of a socio-mindfulness integration system environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for predicting conversation for multi-party discussions. Multi-party discussions (e.g., telecommunication sessions, virtual collaborations, etc.) have become one of the most popular means of facilitating collaboration of participants in a virtual manner. However due to the combination of unawareness, differences, disparities, etc. shared across participants of various cultures, levels of social awareness, attentiveness, and the like, productivity of multi-party discussions can be inhibited. For example in the introductory phase of a multi-party discussion including participants from various cultures, it may be difficult to ascertain a starting point in the conversation; therefore, resulting in awkward pauses and/or hesitation for participants to engage in the multi-party discussion. Such inefficiencies may result in loss of not only participant contribution and valuable time lost in terms of overall productivity of the multi-party discussion, but also collaboration opportunities, delayed work product, etc. It would be helpful to rectify the aforementioned inefficiencies by generating mechanisms configured to analyze and classify linguistic inputs (both current and historical) in order provide conversational starters for multi-party discussions. The present embodiments have the capacity to utilize artificial intelligence and cognitive techniques in order to not only optimize processing of linguistic inputs in a scalable manner that reduces the amount of necessary computational resources, but also render a Post-Salutations Alignment Model (PSAM) configured to integrate socio-mindfulness into multi-party discussions by predicting conversations. Therefore, the present invention optimizes productivity and efficiency of multi-party discussions by predicting conversational starters, but also improves the overall functioning of computers by utilizing artificial intelligence techniques on large datasets (e.g. clustering, etc.) to analyze and process linguistic inputs in a scalable manner that reduces the amount of necessary computing resources.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As used herein, the term "linguistic input" includes a sequence of text, characters, speech acoustics (e.g., pronunciation, intonation, tone, etc.), utterances, message (e.g., email, instant message, direct message, text message, social media post, utterance, etc.), or any other applicable type of input known to those of ordinary skill in the art. In some embodiments, a linguistic input further includes statements, posts/remarks, entries, and the like previously made by multi-party discussion participants on social media platforms, internet-based forums/threads, e-prints forums, web search engines, online encyclopedia, and any other applicable internet-based data source known to those of ordinary skill in the art.

As used herein, the term "multi-party discussion" applies to any applicable form of collaboration that may include telecommunication/cloud-based communications, asynchronous communications, and the like configured to support interactions (e.g., voice, text, multi-media, etc.) between one or more users known to those of ordinary skill in the art. Multi-party discussions as described throughout may apply to one or more telephony systems (e.g., POTS, PBX, VoIP, or other suitable type of telephony service), web-conferencing systems (e.g., WebEx®, GoToMeeting®, Skype®, Microsoft Teams®, etc.), instant messaging services (e.g., Slack®, WhatsApp®, Discord®, Google Hangouts®, etc.), and the like. Multi-party discussions may further comprise virtual collaboration mechanisms including, but not limited to virtual whiteboards, virtual, augmented, mixed, and/or extended reality sessions.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method, and computer program product for predicting conversation for multi-party discussions. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating a computing environment for a socio-mindfulness integration system 200 (hereinafter "system") comprising a server 210 communicatively coupled to a database 215, a linguistics module 220, a linguistics module database 230, a Post-Salutations Alignment Model (PSAM) 240, a PSAM module database 250, and a computing device 260 associated with a user 270, each of which are communicatively coupled over WAN 102 (hereinafter "network") and data from the components of system 200 transmitted across the network is stored in database 215.

In some embodiments, server 210 is tasked with providing the platform configured to host multi-party discussions. Throughout the disclosure, user 270 is used interchangeably with the term "participants", in which the participants are engaged in a multi-party discussion operated and managed by the platform and presented to the participants on computing device 260. Applicable data associated with participants is continuously being collected and stored to database 215 via one or more crawlers associated with server 210 designed and configured to search internet-based sources for relevant data associated with one or more of the participants (e.g., interests, cultural norms, etc.), topic pertaining to current dialogue of the multi-party discussion, and the like. The purpose of the aforementioned is to assist linguistics module 220 with the detection and classification of key phrases within the linguistic inputs that indicate various factors including, but not limited to sentiment, context, greeting, topic, and the like.

Linguistics module 220 is designed to perform various tasks on linguistic inputs such as but not limited to parsing, tokenization, sequence padding, analyzing (e.g., semantic-based, context-based, etc.), or any other applicable or any other task/feature of linguistics, computer science, and artificial intelligence for processing natural language data. For example, linguistics module 220 is designed to receive linguistic inputs, such as a detected conversational utterance of participants, and utilize natural language processing (NLP) techniques, term frequency-inverse document frequency (tf-idf) techniques, and corpus linguistic analysis techniques (e.g., syntactic analysis, etc.) to identify key phrases, parts of speech, and syntactic relations within the linguistic inputs, said corpus linguistic analysis techniques including, but not limited to part-of-speech tagging, statistical evaluations, optimization of rule-bases, and knowledge discovery methods, to parse, identify, analyze linguistic inputs. In some embodiments, linguistics module 220 is further configured to analyze resumes/curriculum vitae, published articles, etc. of participants in a multi-party discussion. Linguistics module 220 is also designed to analyze statements, posts/remarks, entries, and the like previously made by multi-party discussion participants on social media platforms, internet-based forums/threads, e-prints forums, web search engines, online encyclopedia, and any other applicable internet-based data source known to those of ordinary skill in the art. One of the major functions of linguistics module 220 is to utilize Convolutional Neural Networks (CNN) text classification and user intent classification within the linguistic inputs. The CCNs may be utilized to determine the presence or absence of key phrases indicating greetings within the linguistic inputs for the purpose of predicting conversation starters for future multi-party discussions. For example, the CNN models can be used as base models in order to involve more out-of-domain corpus to capture elements of the linguistic inputs. In some embodiments, the models may be pretrained and may include, but are not limited to Bidirectional Encoder Representations from Transformers (BERT), Embeddings from Language Models (ELMO), Universal Sentence Encoder (USE), and so forth. Outputs of techniques performed by linguistics module 220 may be stored in linguistics module database 230.

In addition, linguistics module 220 is configured to encode elements (e.g., topics, sentiment, context, etc.) of the linguistic inputs by converting them into feature vectors. Linguistics module 220 may employ a trained natural language processing model to generate a vector that represents a linguistic input. A vector generated by linguistics module 220 may include any number of dimensions or elements. Linguistics module 220 may include any language encoder, such as a one-hot encoder, a term frequency-inverse document frequency (tf-idf), encoder, a word embedding encoder, and the like. In some embodiments, linguistics module 220 uses a deep averaging network to obtain a static feature representation for a linguistic input in the form of sentence embeddings. Linguistics module 220 may utilize the Universal Sentence Encoder for encoding linguistic inputs.

PSAM module 240 is not only configured to generate the PSAM that is utilized to generate conversational starters for multi-party discussions, but also generate interest graphs and perform extractions of elements of the linguistic inputs for clustering purposes. In some embodiments, the interest graphs are generated in a hierarchal structure, in which the interest graphs may be hierarchal graphs indicating interests associated with participants of a multi-party discussion ascertained from analyses of the linguistic inputs. Interest graphs may be manifestations of connectivity of nodes, the nodes representing topics/subject matter, concepts, theories, and the like connected by edges representing spatial relations between the nodes, social media imprints (e.g., comments, posts, social media activity, etc.) respective participants, and/or elements of dialogues of the multi-party discussions. It should be noted that the outputs of the CNN models operated by linguistics module 220 are stored in PSAM module database 250 and go into the interest graphs allowing temporal data (e.g., interests, hobbies, passions, etc.) to be extracted. Temporal data may include, but is not limited to observation values, timestamp values, local and positional-invariant data, functions of one or more gaps between the aforementioned, and the like. Furthermore, PSAM module 240 is configured to use dialogue graphs of multi-party discussions to build and understand communication patterns among participants.

Computing device 260 may take the form of a desktop computer, laptop computer, tablet computer, computer-mediated reality device (CMR), smart phone, smart watch or other wearable computer, mainframe computer, quantum computer or any other form of computer or mobile device now known or to be developed in the future that is capable of running a program, accessing a network or querying a database.

Figure 3:
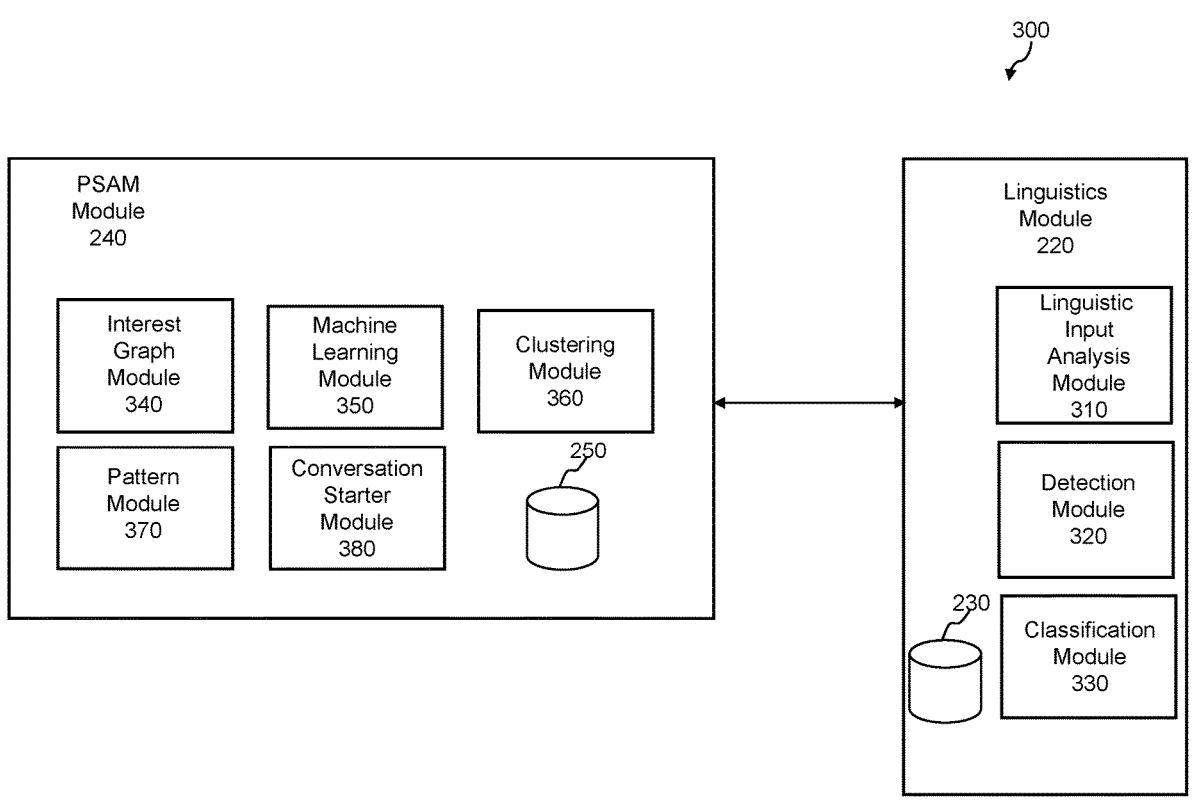
FIG. 3 illustrates a block diagram of various modules associated with the socio-mindfulness integration system of FIG. 2, according to an exemplary embodiment.

Referring now to FIG. 3, an example architecture 300 of linguistics module 220 and PSAM module 240 is depicted, according to an exemplary embodiment. Linguistics module 220 comprises linguistic input analysis module 310, a detection module 320, and a classification module 330. PSAM module 240 comprises an interest graph module 340, a machine learning module 350, a clustering module 360, a pattern module 370, and a conversation starter module 380.

Linguistic input analysis module 310 is tasked with analyzing linguistic inputs utilizing a variety of methods. For example, linguistic input analysis module 310 supports natural language processing (e.g., sentence splitting, tokenization, entity extracting, part-of-speech tagging, dependency parsing, chunking, anaphora resolution, etc.), stemming/lemmatization, concatenation, summation, encoding, and any other applicable trained model-based mechanism configured to process linguistic inputs known to those of ordinary skill in the art. For example, may utilize NLP along with Bidirectional Encoder Representations from Transformers (BERT), Embeddings from Language Models (ELMO), Universal Sentence Encoder (USE), and the like to simultaneously perform observations on the linguistic inputs of a multi-party discussion utilizing linear combinations of statistical measures and hierarchal/global/local evaluations at various temporal spans. As a result, linguistic input analysis module 310 may analyze linguistic inputs segmentally at paragraph, sentence, phrase, word, syllable, and/or phoneme levels. Dialog encoding (i.e., canonicalized representations and contextual history look-up), utterance encoding (i.e., bag-of-word and recurrent neural networks), and other applicable types of semantic encoding are within the spirit of the disclosure. For example, one-hot vectors are utilized as inputs in order to assist discerning negative and positive sentiments along with similarity lists associated with linguistic inputs. Linguistic input analysis module 310 is further configured to perform analyses on collocations and colligations resulting in habitual juxtapositions of keywords and similar/closely related concepts associated with distributional properties derived from the linguistic inputs to be ascertained.

Detection module 320 is designed to detect key phrases associated with the linguistic inputs. In particular, detection module 320 may parse one or more segments of the linguistic inputs ascertained by linguistic input analysis module 310 in order to detect expected or missing key phrases, in which the detection may be based on one or more of stage of a dialogue (e.g., introductory stage, conclusory stage, etc.), contextual information (e.g., subject matter being discussed during dialogue of multi-party discussion), ascertained sentiment, and the like. For example, detection module 320 may search for key phrases expected to be found relating to particular topics (e.g., particular phrases indicating salutations, etc.). Detection module 320 may also account for key phrases missing within dialogue that would indicate that suggested statements are necessary (e.g., salutations recommended in the introductory stage upon detection of a predetermined amount of silence indicating an awkward pause). Furthermore, detection module 320 can take into consideration contextual information associated with the segments in order to ascertain specific topics are being discussed in the dialogue of the multi-party discussion. For example, contextual information such as, but not limited to how (e.g., audio, tone, facial expression captured via video if applicable, etc.), when, why (e.g., utterance made in direct response to a specific question), etc. a key phrase is used may be taken into consideration.

Classification module 330 is tasked with classification and labeling of elements derived from the linguistic inputs. Elements such as, but not limited to sentiment, context, greeting, topic, etc. associated with multi-party discussions may be classified utilizing logic constraints in order to reduce data labeling requirements. In some embodiments, classification module 330 comprises one or more classifiers configured to assign elements embedded in the feature vectors associated with the linguistic inputs to predefined classes; however, this may be performed without explicit predefined rules. For example, classification module 330 utilizes the one or more classifiers on the linguistic inputs associated with a multi-party discussion in order to classify not only the topic, context, sentiment, classification (e.g., greeting, farewell, cultural caesura, etc.), but also the source (i.e., particular participant of multi-party discussion) of the linguistic input. In some embodiments, classification module 330 prioritizes classification based on relevance in which linguistic inputs relating to greetings and salutations are prioritized for classification in order to expedite the facilitation of system 200 generating the predictions as to whether a particular participant in a multi-party discussion is attempting to convey a greeting and/or farewell to the other participants. Furthermore, classifications made by classification module 330 are utilized by PSAM module 240 for various purposes. In particular, the classifications may be utilized for the rendering of interests graphs by PSAM module 240.

Interest graph module 340 is tasked with generating interest graphs associated with multi-party discussions and linguistic inputs. In some embodiments, the interest graphs are directed multigraph network-based graphs starting from the hierarchical structure of linguistic inputs. As previously mentioned, this may also include social media-based imprints (e.g., comments, posts, etc.), published articles, and the like; in which an interest graph may be generated based on various perspectives. For example, analysis of linguistic inputs associated with a multi-party discussion may allow interest graph module 340 to generate a first interest graph relating to social-media derived data (e.g., topics derived from comments and posts) associated with one or more participants and a second interest graph relating to topics discussed during the multi-party discussion, in which the interest graphs are stored in PSAM module database 250. In some embodiments, the interest graphs are directed weighted graphs derived from probabilities that define prediction flow associated with the linguistic inputs, in which the probabilities are maintained by machine learning module 350. For example, an interest graph may comprise probabilities/predictions manifested as a plurality of nodes representing a multitude of topics, concepts, ideas, etc. interconnected via a plurality of edges, in which the temporal data is associated with the aforementioned. Another important role of the interest graphs is to provide a mechanism for machine learning module 350 and other applicable modules of PSAM module 240 to not only build the interest graphs, but also ascertain/extract temporal data associated with the linguistic inputs of the multi-party discussion from the interest graphs. For example, training datasets managed by machine learning module 350 may utilized for the initial set of nodes, edges, weights, etc. associated with the interest graphs, in which machine learning module 350 trains a supervised learning algorithm, such as a neural network, to expand the initial graph by discovering new links and their probabilities. As a result, temporal data is continuously extracted from the interest graphs along with analytics of the interest graphs such as, but not limited to time series-based trends, patterns, and the like.

Machine learning module 350 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 370 is designed to maintain one or more machine learning models dealing with training datasets including data derived from one or more of database 215, linguistics module database 230, PSAM module database 250, and any other applicable internet-based data source. Furthermore, machine learning module 350 is designed to assist clustering module 360 with performing the clustering algorithms on data derived from the interest graphs. For example, one or more Gaussian Mixture Models (GMMs) may be operated by machine learning module 350 in order to assist with the discovery of volatility related to trends and noise within the data; thus, optimized predictions are output from the one or more machine learning models. In particular, the support provided by machine learning module 350 allows clustering module 360 to maintain different clusters for different purposes, in which a first cluster may comprise of a trend in the data relating to time series while a second cluster may comprise noise and volatility from seasonality and/or external events such as, but not limited to global sporting events, weather related events (e.g., earthquake, heatwave, hurricane, etc.), applicable worldly events, and the like.

Clustering module 360 is tasked with not only performing the clustering on data derived from the linguistic inputs and the interest graphs, but also rendering faster convergence of the GMMs. It should be noted that the GMMs are designed to be utilized in order to properly categorize data derived from linguistic inputs and the interest graphs, in which the probability estimates allow the clusters to be labeled by the GMMs assuming that feature vectors may be generated from a mixture of a unit number of Gaussian distributions with unknown parameters. In some embodiments, the use of the GMMs can generalize k-means clustering to incorporate information about the covariance structure of the analytics associated with the aforementioned data in addition to the centers of the latent Gaussians, which allows the GMMs to facilitate behavior analyses associated with participants. In addition, clustering module 360 performs clustering of the temporal data derived from the interest graphs by utilizing the GMMs for Expectation-Maximization (EM), in which the maximum likelihood of maximum a posteriori (MAP) estimates of parameters and statistical models are found. The expectation maximization iteration may alternate between performing an expect (E) step, which may create a function for the expectation of the log-likelihood evaluated using the current estimate for the parameters, and a maximization step, which determines parameters maximizing the expected lock-likelihood found in the E step. Thus, clustering module 360 modifies the parameters according to the hidden variable to maximize the likelihood of the data. However in various embodiments, clustering module 360 is configured to perform other clustering algorithms such as, but not limited to k-means, DBSCAN, hierarchical clustering or any other applicable type of clustering technique known to those of ordinary skill in the art. In some embodiments, clustering module 360 utilizes hyper-parameters in order to identify groups and/or sub-groups within the vector space.

Pattern module 370 is configured to additional pattern analyses on the clusters in order to understand communication trends among the participants. Pattern module 370 may rely on the detection and classification of the key phrases associated with the linguistic inputs to ascertain user intention, dialogue context, etc. from the multiparty discussion. In some embodiments, various categorization mechanisms may be utilized simultaneously by pattern module 370. For example, pattern module 370 may utilize naive bays classification for a first sub-set of linguistic inputs associated with comments/posts of an applicable participant to ascertain their intention, and support vector machines classification for a second sub-set of linguistic inputs associated with uncategorized comments/posts of the applicable participant. This approach allows not only an optimized key phrase classification, but also a continuously improving blend of supervised machine learning and active learning where humans are involved in both the training and testing stages of building the algorithms, which may be directly reflected in the interest graphs. Pattern module 370 may further comprise one or more Latent Dirichlet Allocation (LDA) processors configured to performs topic modeling of the dialogue of multi-party discussions which allows the organization of the linguistic inputs based on the ascertained topics. The LDA processors may perform this by utilizing a naive bayes unigram model, a maximum entropy model, a latent semantic model or any other such technique that is known in the art or developed in the future. The LDA processors may further be designed to support usage of bigrams, trigrams, or more generally, n-grams (number=n) for linguistic input and/or interest graph analysis, and apply one or more topic models to the aforementioned resulting in pattern module 370 outputting of one or more corresponding relevance values that provide an indication of a degree of relevance to which a given topic/subject is relevant to participants. Based on the aforementioned, pattern module 370 may ascertain if a particular linguistic input is a greeting along with whether there is a negative or positive sentiment associated with the greeting. Pattern module 370 also supports generation of sentiment key phrase lists which are analyzed to ascertain not only word clouds, but also why a particular key phrase is classified as negative. On the other hand, word clouds associated with key phrases classified as positive along with their respective key phrase list are transmitted to conversation starter module 380.

Conversation starter module 380 is tasked with maintaining the PSAM model along with providing outputs of the PSAM to user 270 which represent conversation starters for multiparty discussions. Based, at least in part, on input data derived from clustering performed by clustering module 360, conversation starter module 380 employs the PSAM to detect a dialogue of a multiparty discussion and instructs the PSAM generate output data representing at least one conversational starter associated with a multi-party discussion. It should be noted that the conversational starters are positive sentences and positive key phrases recommended to participants for utilization in the applicable dialogue in order to not only eliminate awkward pauses, but also increase overall efficiency and progression of dialogue within multiparty discussions. In some embodiments, conversation starter module 380 may also generate curated lists of conversational starters which function as an aggregation of conversational starters ascertained from previous iterations of the PSAM optimized by one or more supervised and/or unsupervised learning techniques (e.g. feedback loops). The conversational starters may utilize the aforementioned feedback loops to optimize the curated lists by grading the conversational starters in accordance with a positive key phrase threshold, in which based on the reception of a particular key phrase in a multiparty discussion dialogue exceeding the positive key phrase threshold conversation starter module 380 integrates the particular key phrase into the curated lists.

Figure 4:
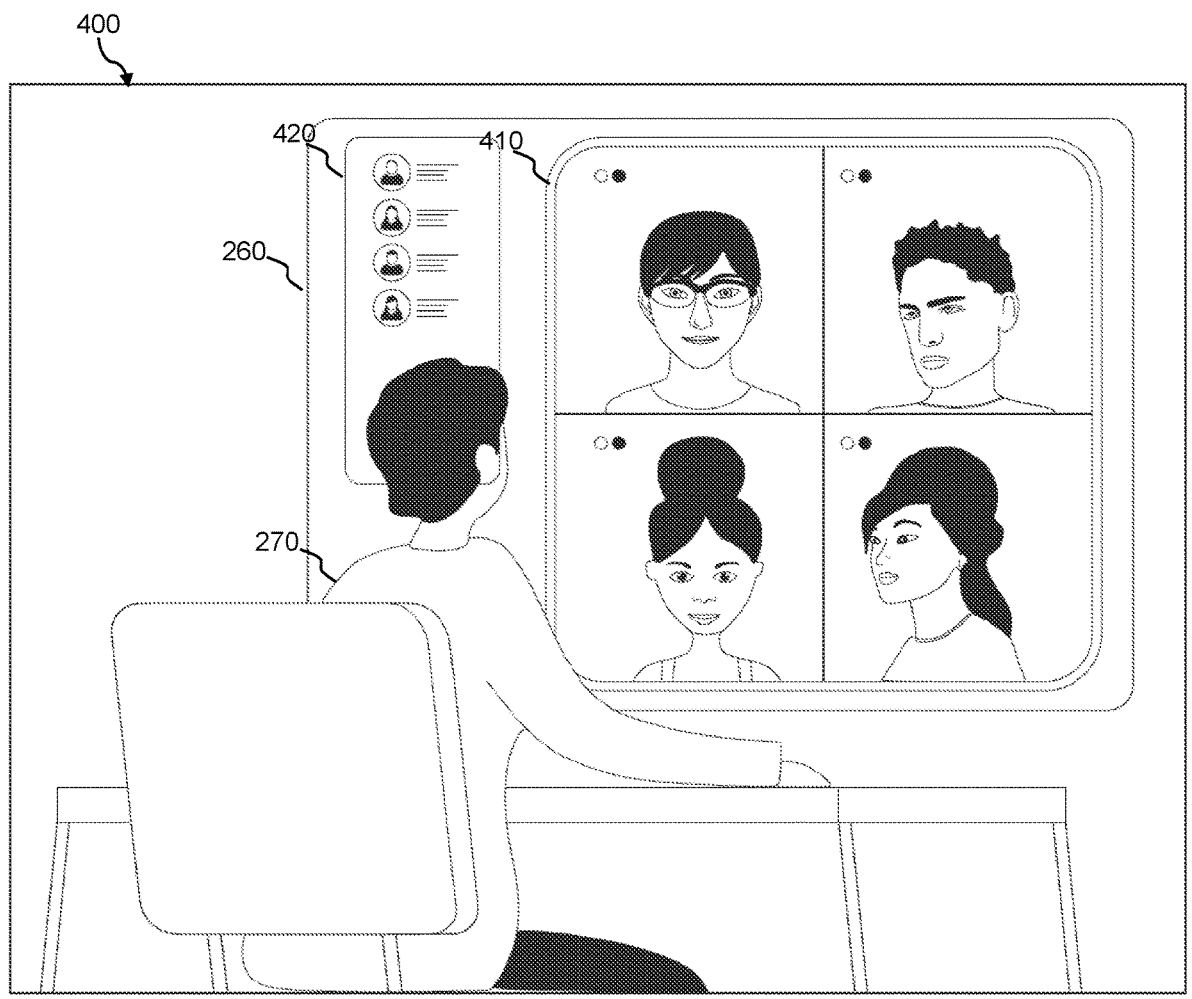
FIG. 4 illustrates a multiparty discussion analyzed by the socio-mindfulness integration system of FIG. 2, according to an exemplary embodiment.

Referring now to FIG. 4, a multiparty discussion 400 being analyzed by system 200 is depicted, according to an exemplary embodiment. As presented, multiparty discussion 400 is hosted on a telecommunication platform 410 configured to host real-time communication sessions presented to user 270 via computing device 260. It should be noted that multiparty discussion 400 is for the purpose of illustrating how conversational starters are to be utilized by user 270 via an exemplary interface during multiparty discussion 400; however, multiparty discussion 400 may also apply to virtual environments (e.g., augmented reality/virtual reality digital spaces, telephonic conferences, etc.). In this example, the exemplary interface comprises conversational starters 420 generated by the PSAM based on analyses of at least linguistic inputs associated with the other participants of multiparty discussion 400, in which conversational starters 400 may be recommended specific to the participants and their linguistic inputs, user profiles, and the like. Thus, for example, user 270 may be the host of multiparty discussion 400 and the other participants may all be silent, in which system 200 generates conversational starters 420 based on previous linguistic inputs associated with the other participants (e.g., system 200 ascertaining topics that resonate with participants). In some embodiments, computing device 260 analyzes (or communicates with server 210 to perform backend analysis) on reactions of the other participants to ascertain whether conversational starters 420 are effective in initiating dialogue within multiparty discussion 400, and the curated list maintained by the PSAM may be updated based on the determination and stored in linguistics module database 230. Ascertain sentiment, tone, and the like associated with components of multiparty discussion 400 and its participants directly optimizes the range of conversational starters 420 in that it supports a feedback loop-like approach to which keywords and concepts have the most significant impact on the progression of multiparty discussion 400.

Figure 5:
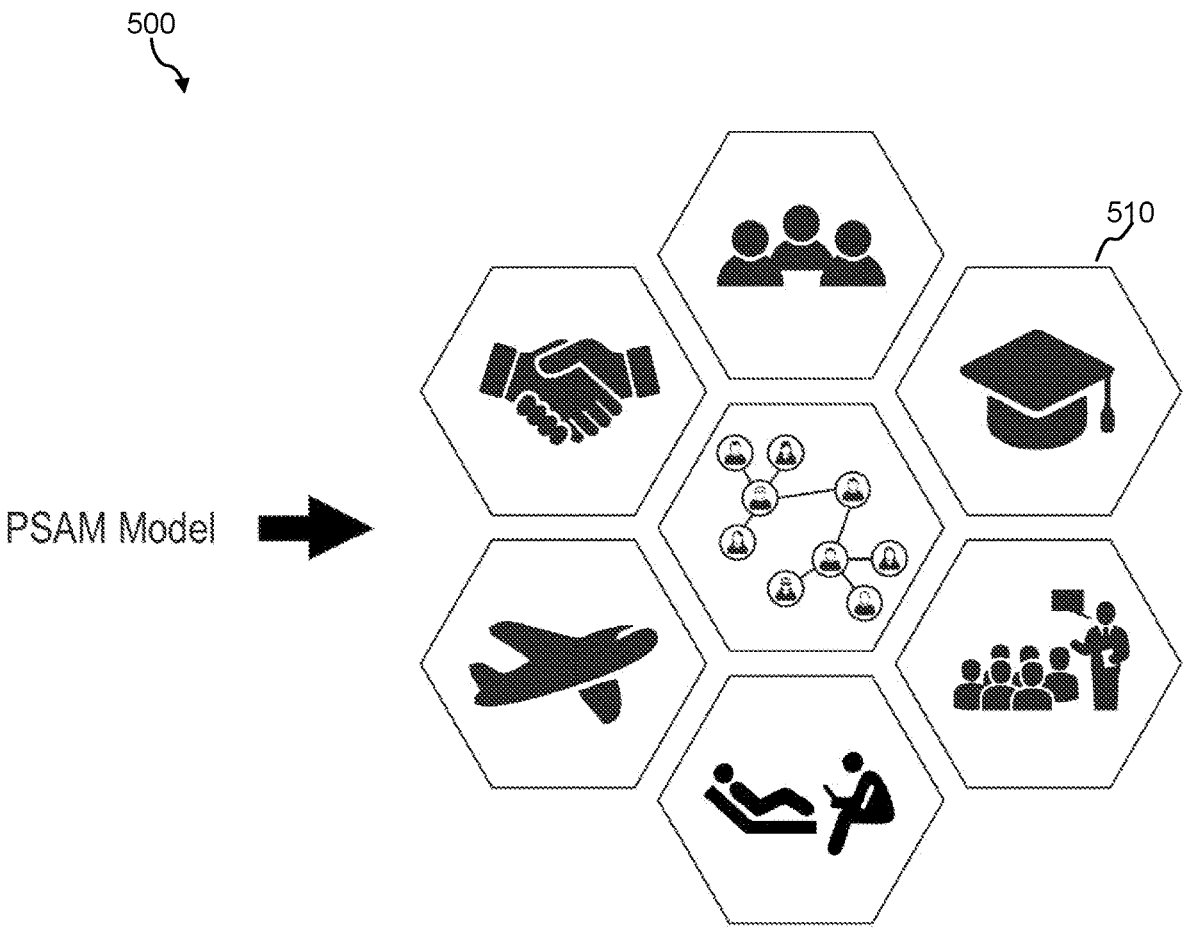
FIG. 5 illustrates a Post-Salutations Alignment Model (PSAM) generated by the socio-mindfulness integration system of FIG. 2, according to an exemplary embodiment.

Referring now to FIG. 5, a Post-Salutations Alignment Model (PSAM) 500 generated by system 200 based on analysis of multiparty discussion 400 is depicted, according to an exemplary embodiment. Due to the continuous integrating and updating of positive sentences and positive key phrases, traversing the voluminous amount of conversational starters stored on PSAM module database 250 must be scalable. For example, historical conversational starters along with results of historic sentiment determinations based on participants' reactions to a particular conversational starter consume a significant amount of space; however, PSAM 500 is able to scalably query PSAM module database 250 by generating conversational starter categories 510 ascertained from the analyses performed by linguistics module 220 that allow PSAM 500 to access conversational starters based on queries PSAM module database 250 in a manner that reduces the amount computing resources that would otherwise be needed. For example, there might be an awkward pause during a multiparty discussion in which PSAM 500 provides suggested conversational starters to user 270 based on the conversational starter categories 510 (e.g., education, travel, partnerships, etc.) associated with participants derived from analyses performed by linguistics module 220, in which the less dead pauses the shorter the meeting time for the multiparty discussion directly impacting on the otherwise needed computational resources needed to stream live video over the network, and store the recording file derived from the multiparty discussion in database 215. Furthermore, PSAM 500 takes into consideration emotional responses of participants to conversational starters by communicating with server 210 to capture participant reactions as a query and returning a sentiment determination (e.g., sound, image, and video of participants during the timeframe of the conversational starter); thus, allowing PSAM 500 to prompt user 270 with a change to the conversational starter that address and/or rectifies underlying tones associated with the detected sentiment.

Figure 6:
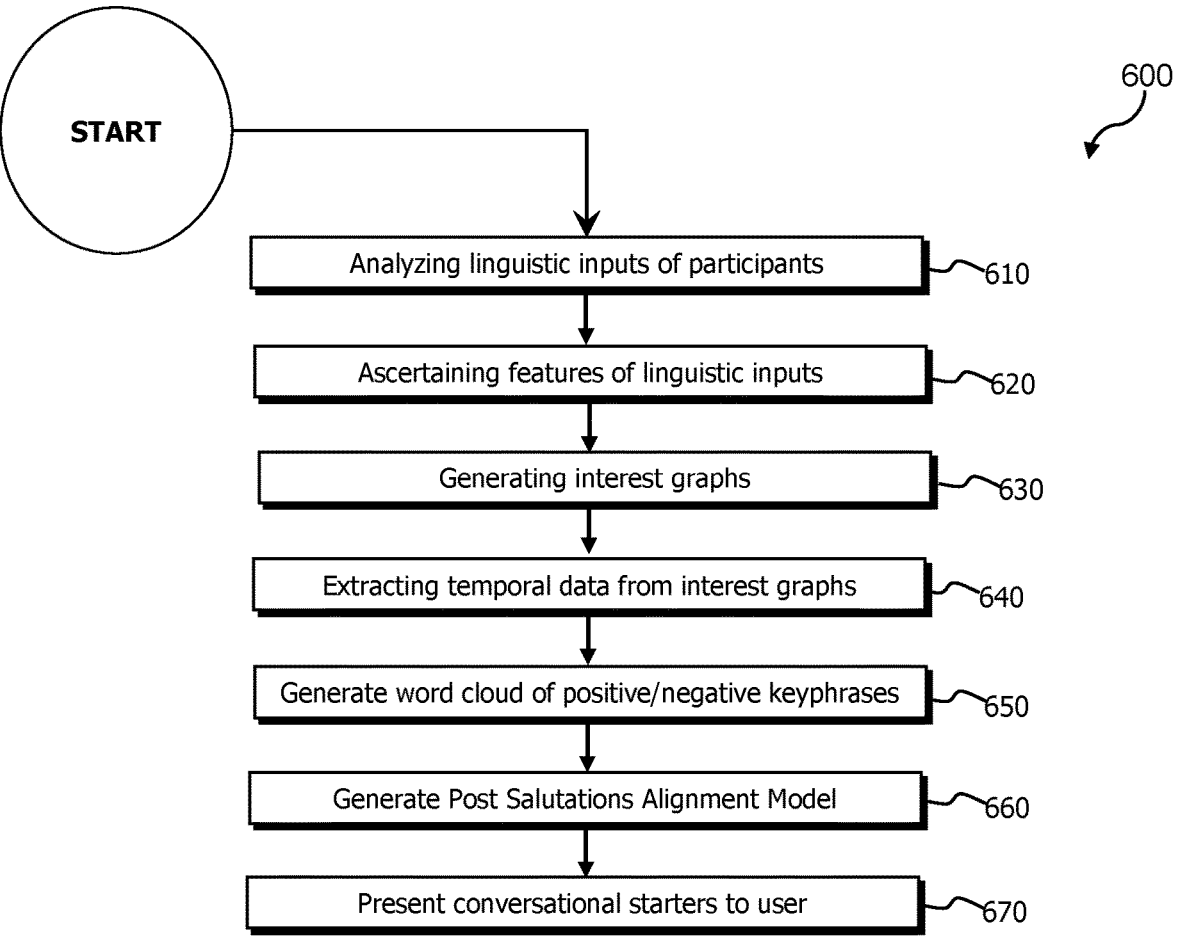
FIG. 6 illustrates an exemplary flowchart depicting a method for predicting conversation for multi-party discussions, according to an exemplary embodiment.

With the foregoing overview of the example architecture, it may be helpful now to consider a high-level discussion of an example process. FIG. 6 depicts a flowchart illustrating a computer-implemented process 600 for predicting conversation for multi-party, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, linguistics module 220 analyzes the linguistic inputs associated with participants of a multiparty discussion. As previously mentioned, linguistic inputs may include, but are not limited to any applicable sequence of text, characters, speech acoustics (e.g., pronunciation, intonation, tone, etc.), utterances, message (e.g., email, instant message, direct message, text message, social media post, utterance, etc.), etc. associated with participants of a multiparty discussion. Linguistic inputs may further include statements, posts/remarks, entries, and the like previously made by multi-party discussion participants on social media platforms, internet-based forums/threads, e-prints forums, web search engines, online encyclopedia, and any other applicable internet-based data source known to those of ordinary skill in the art. Linguistics module 220 may utilize natural language processing (NLP) techniques, term frequency-inverse document frequency (tf-idf) techniques, corpus linguistic analysis techniques (e.g., syntactic analysis, etc.), and the like to identify key phrases, parts of speech, and syntactic relations within the linguistic inputs.

At step 620 of process 600, linguistics module 220 ascertain features of the linguistic inputs based on the analyses. In some embodiments, feature vectors are derived from analyses of the linguistic inputs, in which the feature vectors are embeddings configured to comprise one or more of a sentiment classification associated with a key sentence or key phrase(s) detected within the linguistic inputs, topic/subject classification, temporal data, local and positional-invariant data, and any other applicable type of data designed to be derived from linguistic inputs known to those of ordinary skill in the art. Feature vectors may also be generated by linguistics module 220 performing one or more of parsing, tokenization, sequence padding, analyzing (e.g., semantic-based, context-based, etc.), or any other applicable or any other task/feature of linguistics, computer science, and artificial intelligence for processing natural language data.

At step 630 of process 600, interest graph module 340 generates interest graphs associated with multi-party discussions and linguistic inputs. In some embodiments, interest graph module 340 utilizes CNNs allowing one or more of text classification and user intent classification associated with linguistic inputs, in which a plurality of key phrases associated with the linguistic inputs are detected. Once the interest graphs are rendered utilizing the aforementioned practices, interest graph module 340 may utilize GMMs on the large datasets stored in linguistics module database 230 to identify underlying categories of datasets associated with the linguistic inputs. In some embodiments, the interest graphs are ontology-based representations of concepts derived from the analyses of the linguistic inputs, in which hierarchal clustering mechanisms may be utilized to produce visual bottom-up (agglomerative) or top-down (divisive)

interest graphs which are designed to be depicted to user 270 via graphical user interfaces presented to computing device 260.

At step 640 of process 600, PSAM module 240 extracts temporal data from the interest graphs. As previously mentioned, temporal data may include, but is not limited to observation values, timestamp values, local and positional-invariant data, functions of one or more gaps between the aforementioned, and the like. Extracting of temporal data may comprise timestamping slices of data derived from the linguistic inputs at various time intervals allowing correlations among concepts, hobbies, interests, etc. to be applied to the dialogues of the multi-party discussions (e.g., GMMs utilized to render predictions on the aforementioned). For example, a first cluster may comprise of a trend in time series while a second cluster comprises noise and volatility analytics associated with seasonality or external events.

At step 650 of process 600, pattern module 370 generates word clouds derived from sentiment key phrase lists. It should be noted that the classification of a key sentence and/or key phrase associated with the linguistic inputs as negative or positive indicates the type of word cloud it will be. In addition, pattern module 370 analyzes why a particular key sentence and/or key phrase is negative or positive in order to not only optimize classification, but also establish context and intentions for how the particular key sentence and/or key phrase should be used in the multi-party discussion if applicable. Scoring, ranking, predetermined thresholds, and the like may be utilized by pattern module 370 on the sentiment key phrase lists in order to determine which key sentence and/or key phrase should be included in which word clouds.

At step 660 of process 600, PSAM module 240 generates the PSAM. In some embodiments, the PSAM is generated by PSAM module 240 utilizing Gaussian Mixture Models (GMM) for Expectation-Maximization (EM) clustering of the temporal data extracted from the interest graphs followed by PSAM module 240 performing topic modeling by using Latent Dirichlet Allocation (LDA), wherein the topic modeling is based on a plurality of results of the Expectation-Maximization (EM) clustering. In particular, based, at least in part, on input data derived from clustering performed by clustering module 360, conversation starter module 380 employs the PSAM to detect a dialogue of a multiparty discussion and instructs the PSAM generate output data representing at least one conversational starter associated with a multi-party discussion. One or more feedback loops operated by machine learning module 350 function to optimize keyword-based classification and user intent detection, in which the interest graphs are also being hyper-analyzed to understand communication patterns among participants.

At step 670 of process 600, conversational starter module 380 presents one or more conversational starters to user 270 on computing device 260. In addition to maintain the PSAM, conversation starter module 380 provides outputs of the PSAM to user 270 which represent conversation starters for multiparty discussions based on the analyses of the linguistic inputs associated with each participant of the multi-party discussion. It should be noted that the PSAM is utilized to generate at least one conversational starter associated with a multi-party discussion, in which conversational starter module 380 may perform analytics on conversational starters based on the detected reactions (e.g., gestures, statements, facial reactions, and the like) of participants to one or more conversational starters utilized by user 270 in the multi-party discussion.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for predicting conversation for multi-party discussions, the method comprising:

analyzing, by a computing device, a plurality of linguistic inputs;

generating, by the computing device, an interest graph based on the analysis;

extracting, by the computing device, a plurality of temporal data from the interest graph; and generating, by the computing device, a Post-Salutations Alignment Model (PSAM) based on clustering of the plurality of temporal data via Gaussian Mixture Models (GMM) for Expectation-Maximization (EM) clustering.

2. The computer-implemented method of claim 1 further comprising:

utilizing, by the computing device, the PSAM to generate at least one conversational starter associated with a multi-party discussion.

3. The computer-implemented method of claim 1, wherein clustering of the plurality of temporal data comprises:

utilizing, by the computing device, the GMM for Expectation-Maximization (EM) clustering to discover a plurality of trends and noise within the plurality of linguistic inputs.

4. The computer-implemented method of claim 1, wherein generating the PSAM comprises:

performing, by the computing device, topic modeling by using Latent Dirichlet Allocation (LDA).

5. The computer-implemented method of claim 4, wherein the topic modeling is based on a plurality of results of the EM clustering.

6. The computer-implemented method of claim 1, wherein analyzing the plurality of linguistic inputs comprises:

utilizing, by the computing device, Convolutional Neural Networks (CNN) for one or more of text classification and user intent classification associated with the plurality of linguistic inputs.

7. The computer-implemented method of claim 6, wherein text classification and user intent classification comprise:

detecting, by the computing device, a plurality of key phrases associated with the plurality of linguistic inputs.

8. A computer program product for predicting conversation for multi-party discussions, the computer program product comprising one or more computer readable storage media and program instructions collectively stored on the one or more computer readable storage media, the stored program instructions comprising:

program instructions to analyze a plurality of linguistic inputs;

program instructions to generate an interest graph based on the analysis;

program instructions to extract a plurality of temporal data from the interest graph; and program instructions to generate a Post-Salutations Alignment Model (PSAM) based on clustering of the plurality of temporal data via Gaussian Mixture Models (GMM) for Expectation-Maximization (EM) clustering.

9. The computer program product of claim 8, the stored program instructions further comprising:

program instructions to utilize the PSAM to generate at least one conversational starter associated with a multi-party discussion.

10. The computer program product of claim 8, wherein program instructions to cluster the plurality of temporal data comprise:

program instructions to utilize the Gaussian Mixture Models (GMM) for Expectation-Maximization (EM) clustering to discover a plurality of trends and noise within the plurality of linguistic inputs.

11. The computer program product of claim 8, wherein program instructions to generate the PSAM comprise:

program instructions to perform topic modeling by using Latent Dirichlet Allocation (LDA).

12. The computer program product of claim 11, wherein the topic modeling is based on a plurality of results of the Expectation-Maximization (EM) clustering.

13. The computer program product of claim 8, wherein program instructions to analyze the plurality of linguistic inputs comprise:

program instructions to utilize Convolutional Neural Networks (CNN) for one or more of text classification and user intent classification associated with the plurality of linguistic inputs.

14. The computer program product of claim 13, wherein text classification and user intent classification comprise:

program instructions to detect a plurality of key phrases associated with the plurality of linguistic inputs.

15. A computer system for predicting conversation for multi-party discussions, the computer system comprising:

one or more processors;

one or more computer-readable memories;

program instructions stored on at least one of the one or more computer-readable memories for execution by at least one of the one or more processors, the program instructions comprising:

program instructions to analyze a plurality of linguistic inputs;

program instructions to generate an interest graph based on the analysis;

program instructions to extract a plurality of temporal data from the interest graph; and program instructions to generate a Post-Salutations Alignment Model (PSAM) based on clustering of the plurality of temporal data via Gaussian Mixture Models (GMM) for Expectation-Maximization (EM) clustering.

16. The computer system of claim 15, the stored program instructions further comprising:

program instructions to utilize the PSAM to generate at least one conversational starter associated with a multi-party discussion.

17. The computer system of claim 15, wherein program instructions to cluster the plurality of temporal data comprise:

program instructions to utilize the Gaussian Mixture Models (GMM) for Expectation-Maximization (EM) clustering to discover a plurality of trends and noise within the plurality of linguistic inputs.

18. The computer system of claim 15, wherein program instructions to generate the PSAM comprise:

program instructions to perform topic modeling by using Latent Dirichlet Allocation (LDA).

19. The computer system of claim 18, wherein the topic modeling is based on a plurality of results of the Expectation-Maximization (EM) clustering.

20. The computer system of claim 18, wherein program instructions to analyze the plurality of linguistic inputs comprise:

program instructions to utilize Convolutional Neural Networks (CNN) for one or more of text classification and user intent classification associated with the plurality of linguistic inputs.

\*    \*    \*    \*    \*